US006987220B2

(12) United States Patent
Holcombe (10) Patent No.: US 6,987,220 B2
(45) Date of Patent: Jan. 17, 2006

(54) GRAPHIC COLOR MUSIC NOTATION FOR STUDENTS (76) Inventor: Jane Ellen Holcombe, 176 Broadway, 5C, New York, NY (US) 10038

( * ) Notice: Subject to any disclaimer, the term of this patent is extended or adjusted under 35 U.S.C. 154(b) by 427 days.

(21) Appl. No.: 10/289,199

(22) Filed: Nov. 6, 2002

(65) Prior Publication Data
US 2004/0007118 A1 Jan. 15, 2004

Related U.S. Application Data (60) Provisional application No. 60/394,567, filed on Jul. 9, 2002.

(51) Int. Cl.
G09B 15/02 (2006.01)
(52) U.S. Cl. .................... 84/483.2; 84/485 R
(58) Field of Classification Search ............ 84/483.2, 84/483.1, 485 R
See application file for complete search history.

(56) References Cited

U.S. PATENT DOCUMENTS

| 104,393 | A |   | 6/1870 | Wright |  |
|---|---|---|---|---|---|
| 122,096 | A |   | 12/1871 | Acee |  |
| 347,686 | A |   | 8/1886 | Carpenter et al. |  |
| 2,221,143 | A |   | 11/1940 | Lang |  |
| 3,698,277 | A | * | 10/1972 | Barra | 84/483.1 |
| 5,549,029 | A | * | 8/1996 | Lepinski | 84/483.2 |
| 5,574,238 | A | * | 11/1996 | Mencher | 84/483.2 |
| 5,775,915 | A | * | 7/1998 | Quinn | 434/156 |
| 5,962,800 | A | * | 10/1999 | Johnson et al. | 84/483.2 |
| 5,998,721 | A | * | 12/1999 | Lepinski | 84/483.2 |
| 6,057,501 | A | * | 5/2000 | Hale | 84/470 R |
| 6,124,540 | A | * | 9/2000 | Lotito | 84/483.2 |
| 6,127,616 | A | * | 10/2000 | Yu | 84/483.2 |
| 6,388,181 | B2 | * | 5/2002 | Moe | 84/477 R |
| 6,407,323 | B1 | * | 6/2002 | Karapetian | 84/477 R |
| 6,476,303 | B1 | * | 11/2002 | Mutou et al. | 84/483.2 |
| 6,660,921 | B2 | * | 12/2003 | Deverich | 84/470 R |
| 6,791,568 | B2 | * | 9/2004 | Steinberg et al. | 345/600 |
| 6,831,219 | B1 | * | 12/2004 | Bonham | 84/483.2 |
| 6,831,220 | B2 | * | 12/2004 | Varme | 84/483.2 |
| 2002/0117043 | A1 | * | 8/2002 | Powley | 84/483.2 |
| 2004/0074376 | A1 | * | 4/2004 | Varme | 84/483.2 |
| 2004/0255755 | A1 | * | 12/2004 | Kestenbaum et al. | 84/483.2 |

OTHER PUBLICATIONS

Arno Peters, Die Masstablicke Darstellung Der Tondauer Als Grundlage Oktave-Analoger Farbnotation.
Fritz Dobretzberger and Johannes Paul Farbmusik, 1993, 147 pages total, Simon +Leutner, Verlag Berlin, Germany.

* cited by examiner

Primary Examiner—Marlon T. Fletcher
Assistant Examiner—David S. Warren (57) ABSTRACT A method of music notation with 7 spaces for the notes of the C major scale, with the remaining notes of the 12 tone scale overlapping these spaces. 5 staff lines per octave can be used to show the position of the accidental notes. Distinct colors are assigned to the 12 notes of the scale. Two distinct groups of colors are used, one for coloring the C major notes, the other for coloring the remaining 5 notes of the scale. The spaces representing Cs are marked with a colored shape at the left of the staff and shaded horizontally across the page. The notes are shapes whose width is proportional to their durations. Aids are placed above and below the staff to indicate hand and finger movements. Assembly kits with visual aids are provided. The colors can be used on conventional notation.

15 Claims, 8 Drawing Sheets

GRAPHIC COLOR MUSIC NOTATION FOR STUDENTS

CROSS-REFERENCE TO RELATED APPLICATIONS

This application claims the benefit of the filing of U.S. Provisional Patent Application Ser. No. 60/394,567 entitled "More spatially-oriented music notation for keyboard players and beginning musicians," filed on Jul. 9, 2002.

FEDERALLY SPONSORED RESEARCH

Not Applicable

SEQUENCE LISTING OR PROGRAM

Not Applicable

BACKGROUND OF THE INVENTION

1. Field of Invention

This invention is a new spatially oriented graphic color notation for music, designed to facilitate learning of musical instruments and conventional notation.

2. Background of the Invention

The basic format of our current notation system has existed for hundreds of years. In this format, the 7 notes of the C major scale alternate between the lines of a staff and the spaces in between. For instance, in the bass clef, C is in the space between the $2^{nd}$ and $3^{rd}$ line from the bottom, D is on the $3^{rd}$ line from the bottom and E is in the space above the $3^{rd}$ line. Since there are only 7 notes per octave, and the alternation between spaces and lines is continuous, C's alternate from octave to octave in terms of whether they are on a space or a line. The other 7 notes of the chromatic scale do not have a space allocated to them. Instead, they are represented as raisings (sharps) of the C major notes, or lowerings (flats) of the C major notes. These raisings and lowerings are indicated by the use of accidentals placed either next to the note or in a key signature at the left side of each staff.

The current music notation system presents many problems to the new student of musical instruments. Notes with the same name in the scale look different in every octave and in every clef. For example, G3 is represented by a note on the lowest line of the bass clef, G4 is a note between the top two lines of the clef and G5 is on the second line of the treble clef. Also, the relative duration of notes is expressed with a large number of symbols, all of which must be learned. Notes not in the diatonic scale of C major are represented by a combination of key signature and accidentals, which must be remembered and/or interpreted as the music is being read. Notes above and below the staff are depicted with extra ledger lines that require counting. Finally, the large number of different symbols involved makes the notation visually complex and confusing. These factors combine to make the learning of traditional music notation daunting to many students.

Many attempts have been made to solve this problem. H. Wright's U.S. Pat. No. 104,393 (1870) describes a staff consisting of 5 lines and 7 spaces per octave, the lines representing the black keys of the keyboard and the spaces representing the white keys. Notes in conventional notation form were placed on the lines for accidental (black key) notes, or in the spaces for the C major scale white keys. This eliminated the need for accidentals. However, once this staff was extended beyond a single octave it became difficult to read. This particular staff has been advocated by many other musicians over the years, and is sometimes referred to as a staff with keyboard spacing. Its primary attraction is that it retains the separation of the 7 "natural" notes of the C major scale from the "accidental" notes. At the same time it removes the need for accidentals. In addition, the notation looks the same for every octave, unlike traditional notation.

Another approach to improving conventional notation has been to assign different colors to each of the 7 notes of the diatonic scale or to each of the 12 notes of the chromatic scale. U.S. Pat. No. 122,096 (F. W. Acee, 1871) assigns 7 colors to the notes of the diatonic scale for aid in sight singing. However, this approach does not eliminate the visual confusion produced by seeing the same note represented on a line in one clef and on a space in another. In addition, it still requires the student to memorize the different forms of notes and rests indicating durations.

Another form of simplified music notation is referred to as piano roll notation, or time-notation. The name comes from the resemblance to paper rolls for player pianos, where holes were cut in proportion to the length of the notes to be played. U.S. Pat. No. 347,686 (E. P. Carpenter & M. S. Wright, 1886) includes a form of this notation. The notes are displayed as rectangles whose height is proportional to the duration of the notes (this notation is read vertically). Today, various forms of this notation, generally read horizontally, are commonly used in computer programs to display and edit data from musical performances. The virtue of this form of notation is it allows for a more exact representation of rhythm than conventional notation. However, sight reading of music with this notation is very difficult, because the actual notes being sounded are not visually differentiated. To determine the note, you follow the space back to the accompanying diagram either of a keyboard or of note names.

The invention described in U.S. Pat. No. 2,221,143 (B. M. Lang, 1940) uses both color and a proportional method of expressing the duration of notes. This invention assigns colors to all 12 notes of the chromatic scale. It also includes a very simple form of notation in which there is no staff or clef to be understood. In this form of notation, colored boxes are placed in a straight row horizontally across the page. Each box represents one quarter note. Longer notes are indicated by having several boxes in a row divided by a thin line, while all other boxes have a heavy line in between. While simple to read, this notation is very limited in application, since it does not include any way to notate more than one note sounding at a time.

The invention described in U.S. Pat. No. 3,698,277 (D. P. Barra, 1972) adds color to a form of piano roll notation, using a different color for each theme in the music, as well as background color to indicate areas of different harmonic content. Varying shades of intensity are used to indicate the loudness and softness of notes. However, the bars representing notes are placed on a conventional staff requiring the reader to have previously memorized all the note locations of the treble and bass clefs, as well as the meaning of accidentals and key signatures.

In 1984, Arno Peters, the creator of the Peters Projection Map, presented his ideas for a new notation at the Mozarteum in Salzburg. This lecture was revised and published in 1985, in German and English, under the title "Peters Notation, The Proportionate Representation of the Duration of Notes as the Basis for Octave-Analogous Colour Notation". Peters Notation uses vertical spacing exactly proportional to the spacing of the black and white keys on a piano and depicts each note as a rectangle whose width is proportional to its duration, as in piano roll notation. The music staff is shown as vertical bands of color. White is used for the spaces representing Cs and six different colors are used for each of the other notes of the C major scale. Slightly darker shades of the colors are used for the area above middle C, while the bands below middle C are paler. A grid of squares is placed over the entire staff, with darker lines optionally delineating beats and measures. C major scale notes are drawn as hollow rectangles, letting the color band show through, while the other 5 notes of the 12 tone chromatic scale are drawn as solid rectangles, in one of several dark colors, depending on whether the notation is keyboard, organ or instrumental.

While this notation is very easy to understand conceptually, it is not so easy to read. The advantage of using color to distinguish between notes of different pitches is that the eye is drawn to colors and recognizes them easily if they are sufficiently contrasting. So, reading a page of music from left to right, as colored notes are seen, the brain gets a message, green, and translates that as the note to be played. Then it sees the next note, red and translates that. This kind of translation can be made very rapidly. The effect of seeing a series of notes in color is very different from seeing notes drawn on bands of color. Since the music staff always looks the same from the point of view of color when the notes are drawn on bands of color, no active recognition of color occurs as the eye moves across the page.

FarbMusik (German for color music) is the name of another form of music notation that combines the use of color and proportional representation of duration. This notation is documented in "FarbMusik" by Fritz Dobretzberger and Johannes Paul, published by Simon+Leutner, 1993. The keyboard version of the notation is read vertically from the bottom to the top of the page. Other versions are read horizontally from left to right. The following references relate to the horizontal version of the notation which is more common in music notation.

FarbMusik divides the vertical space of an octave into twelve equal intervals and locates the middle of the lower edge of each note in a vertical position exactly relative to its place in the scale. Durations are proportionally represented as in piano roll notation. Each of the twelve notes of the chromatic scale is depicted in a different color, in the same order as the color wheel. FarbMusik distinguishes the 7 notes of the C major scale from the remaining 5 notes by using different shapes. The C major notes are rectangular. Each of the remaining 5 notes of the 12 tone chromatic scale has two different shapes, one for each enharmonic spelling. For example, the raised note C# has a note shape whose outer edges are at an equal height with the note C with an arch in the middle with the curve going up. The lowered note Db has a similar note shape, but with the outer edges at the height of the note D and the middle curving down. Both C# and Db are depicted in the same color. The fact that the same note has two different shapes and two slightly different vertical locations can be very confusing to students.

In FarbMusik each pitch does not have its own discrete vertical location in the notation space. Instead the notes representing adjacent pitches overlap to different extents depending on the type of music—single voice, keyboard music without chords, music with chords. For example, for single voice music, the vertical height of each note is the height of a whole octave. So, when a B is followed by a C, the B and C overlap for 11 twelfths of their height. The result of the overlapping is that the notation does not appear to have a clear vertical position for each pitch, but provides just a general sense of up and down.

A significant problem in this notation occurs in the use of color. As stated above, each note in the scale is allocated a different color in the same order as they appear on the color wheel. However, the twelve colors are all in the series of values (lightness and darkness) commonly used in a color wheel. The disadvantage to this system is that colors close to each other in the color wheel are often difficult to distinguish. Take for example, the sequence orange, orange-red, and red. It is very easy to be uncertain as to whether an orange-red is orange, orange-red or red, depending on what other colors are present near to it.

The combination of the different shapes and positions for the same note, the overlapping of notes, and the closeness of adjacent colors makes it easy to make mistakes when reading this music. Also, the sense of uncertainty and confusion that can occur when a student is unclear about what note to play is very discouraging to students.

Each of the approaches above simplifies one or more aspects of learning music notation, but still presents the student with significant difficulties.

OBJECTS OF THE INVENTION

Several objects of the present invention are: (a) to eliminate the need to memorize note names and their locations on different clefs before reading music, (b) to eliminate the need to memorize many different types of notes and rests in order to determine the duration of notes, (c) to eliminate the need to memorize and interpret key signatures and accidentals in order to determine when to raise or lower notes in order to play notes not in the C major scale, (d) to provide strong visual indications of the pitch of the note to be played, (e) to provide additional reinforcing visual indications on whether the note to be played is a C major (natural) or accidental note, (f) to provide a form of music notation that has a direct spatial correspondence to the proportional start times and durations of the notes, (g) to optionally provide the student with indications of the specific hand and finger movements required to execute the music, (h) to provide a less cluttered form of notation by removing stems, rests and accidentals, making it easier to visually focus on actual note locations, durations and fingering, (i) to provide a student with the means of studying a simple instrument without the aid of a teacher, and (j) to provide a pathway from reading this form of notation to reading conventional notation.

BRIEF SUMMARY OF THE INVENTION

This new form of music notation has seven spaces per octave representing the 7 notes of the C major diatonic scale, the notes that can be designated in conventional notation without the use of accidentals. 5 staff lines per octave are placed according to the location of the remaining 5 notes of the 12 tone chromatic scale. C major notes occupy the spaces, while the remaining 5 notes straddle the five lines. Spaces representing C's are specially marked at the left of the staff in each octave and are shaded across the width of the staff. Each individual note in the 12 tone scale has its own color, e.g. all Cs are gold, reinforcing visual recognition of what note is seen. Two perceptibly distinct groups of colors are used to color the notes. One group is used to color the notes of the C major scale, while the other group is used to color the remaining 5 notes of the 12 tone chromatic scale, also called accidental notes, due to the fact that they can only be represented in conventional notation by the use of an accidental, either adjacent to the note or in the key signature. All notes are colored shapes which are extended within a grid space that shows the proportional start times and durations of the notes, also defining measure and beat boundaries. Where appropriate, notes that are to be played by the left hand are represented by a different shape than the shape used to represent notes played by the right hand, so that they are clearly distinguishable from right hand notes. The notation includes optional aids for showing hand and finger movements. Music notation assembly kits are provided to further simplify the process of learning the notation. Once students have reached proficiency in this system, the use of the same groups of colors on conventional notation provides a pathway to learning the location of notes on the various clefs and the meaning of accidentals and key signatures.

In order that this invention may be more readily understood it will be described with reference to the following Figures, which are plan views of embodiments of this invention. Note that the numbers 1 to 5 when appearing in the figures refer to the specific fingers used to play each note. The number 1 indicates the thumb, the number 2 indicates the index finger, the number 3 indicates the middle finger, the number 4 indicates the ring finger, and the number 5 indicates the little finger. To avoid confusion, the reference numbers in the figures start with the number 10.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 3 shows an alternative embodiment of this invention where two staffs are created, one above and one below middle C and lyrics are inserted in between.

DETAILED DESCRIPTION OF THE FIGURES

Note that the numerals 1 to 5 when appearing in the figures refer to the specific fingers used to play each note. The number 1 indicates the thumb, the number 2 indicates the index finger, the number 3 indicates the middle finger, the number 4 indicates the ring finger, and the number 5 indicates the little finger. To avoid confusion, the reference numbers in the figures start with the number 10.

Figure 1:
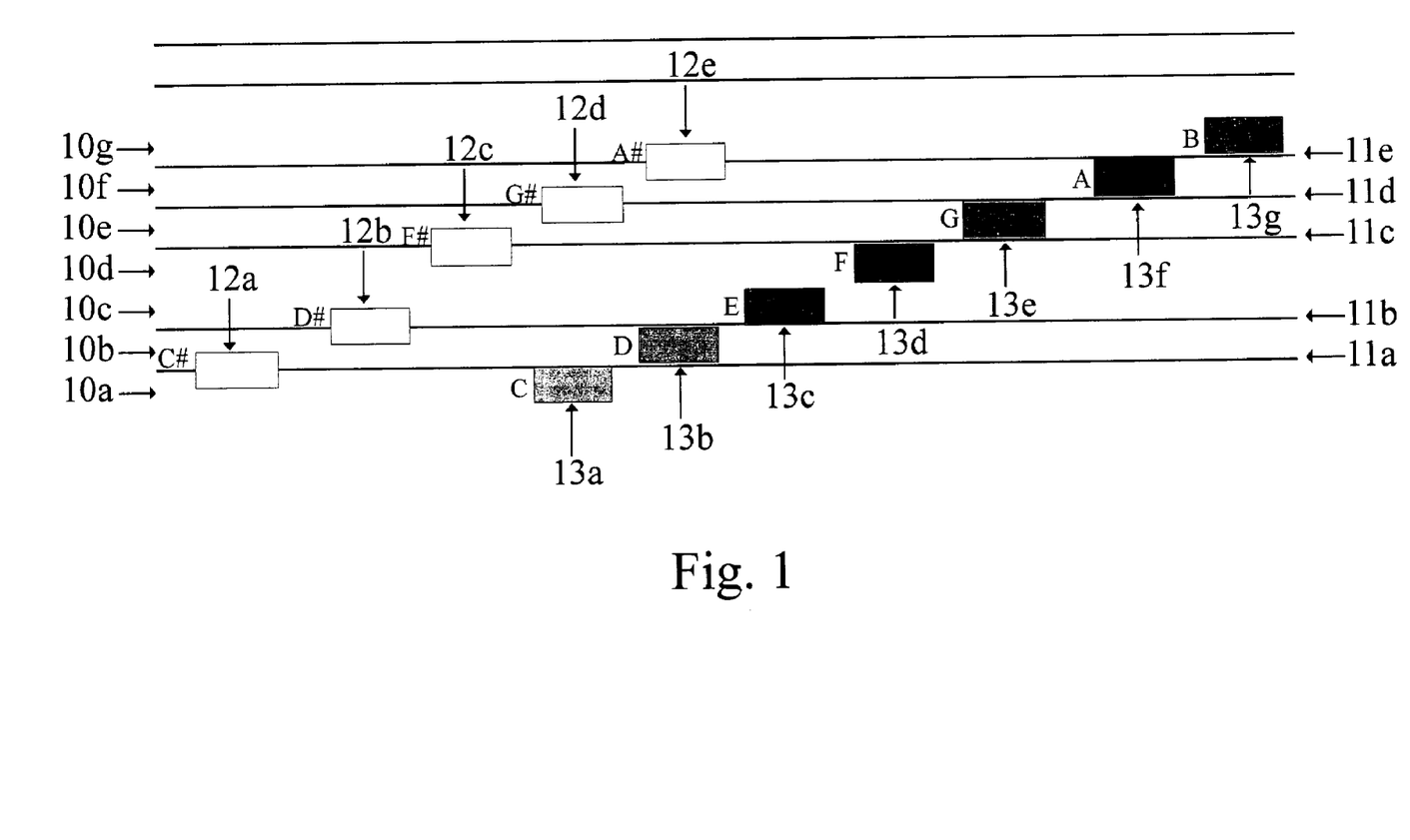
FIG. 1 shows the layout of the staff lines of the preferred embodiment of this invention and the layout of the 12 notes of the chromatic scale.

FIG. 1 shows the layout of the staff and notes. Seven spaces, 10a, 10b, 10c, 10d, 10e, 10f, and 10g are provided per octave for the seven notes of the C major scale. Five staff lines, 11a, 11b, 11c, 11d, and 11e, per octave are placed vertically at distances corresponding to the relative location of the 5 accidental notes within the seven C major note spaces. The five accidental notes, 12a, 12b, 12c, 12d and 12e, straddle the staff lines and are colored with pale colors, C# pale yellow, D# pale red orange, F# pale blue violet, G# pale blue green and A# pale green. The seven C major notes, 13a, 13b, 13c, 13d, 13e, 13f, and 13g, are positioned in the spaces between the staff lines and are colored with bright colors, C gold, D orange, E red, F purple, G blue, A green and B yellow green.

Figure 2:
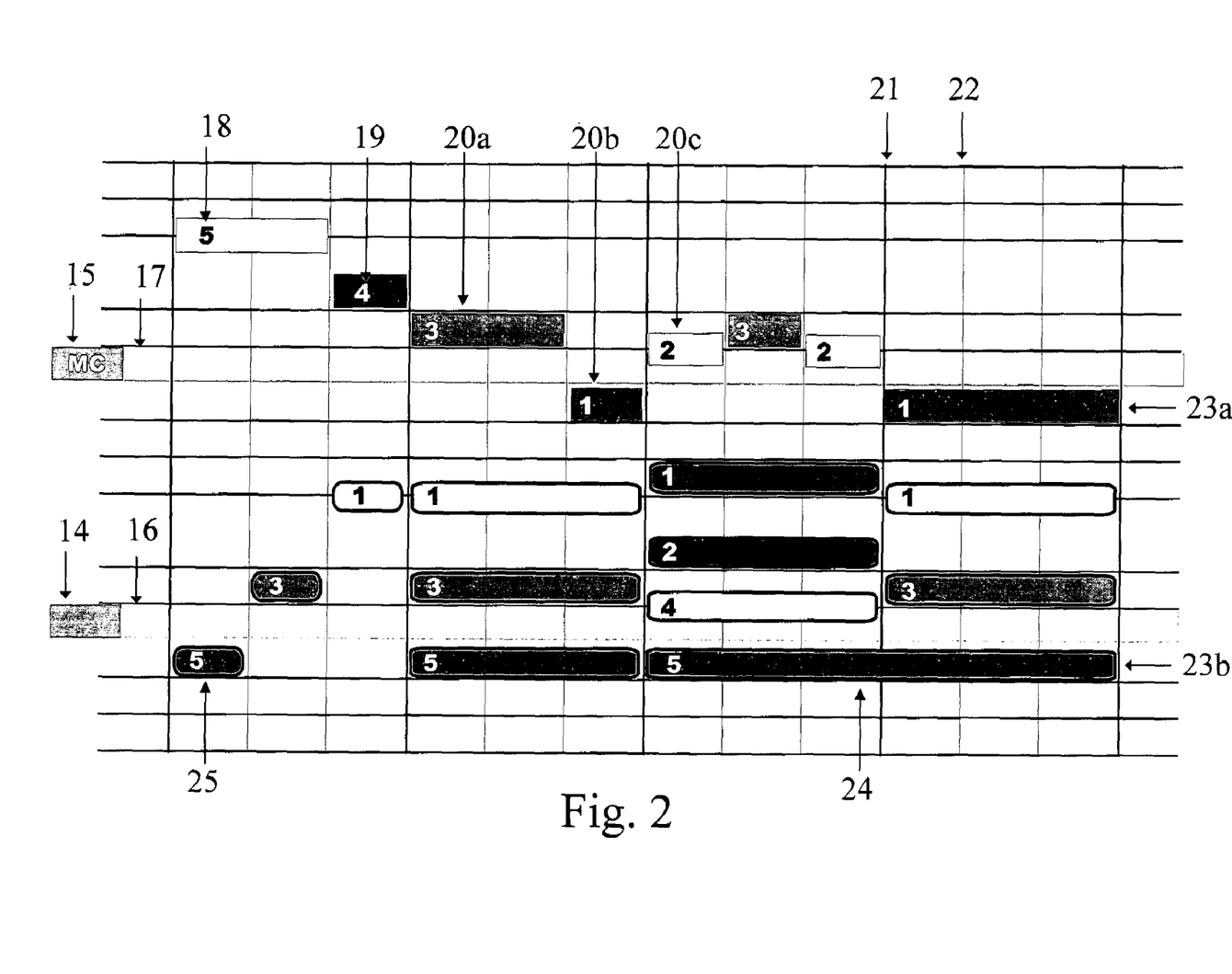
FIG. 2 shows a piece of music written in the preferred embodiment of this notation and illustrates many details of the invention.

FIG. 2 shows a piece of music written in the preferred embodiment of the invention. A space representing a C is marked with a gold shape, 14, at the left of the staff. Middle C is specially marked with the letters MC, 15, on its gold shape. A space representing a C is distinguished by light gray shading, 16, extended across the page. Middle C is specially marked with a darker shade of gray, 17, also extending across the page. Fingering indicators, 18, for accidental notes are in black on pale colors. Fingering indicators, 19, for C major notes are in white on bright colors. Notes, 20a, 20b and 20c, are displayed as rectangular shapes, with widths corresponding to their relative duration. The first note of this group, 20a, is twice as wide as the other two because it is played twice as long. A vertical line in a bold point size, 21, appears between bars. A vertical line in lighter print, 22, marks the end of a beat. Notes of the same name, 23a and 23b always appear in the same color. These two Bs, 23a and 23b are both bright yellow green, reinforcing their common attributes as B. A note extending over a bar line, 24, is shown as a continuous rectangular shape, instead of as two notes tied together as in conventional notation. A note played by the left hand, 25, has rounded edges and a heavier border to distinguish it from keys played by the right hand.

Figure 3:
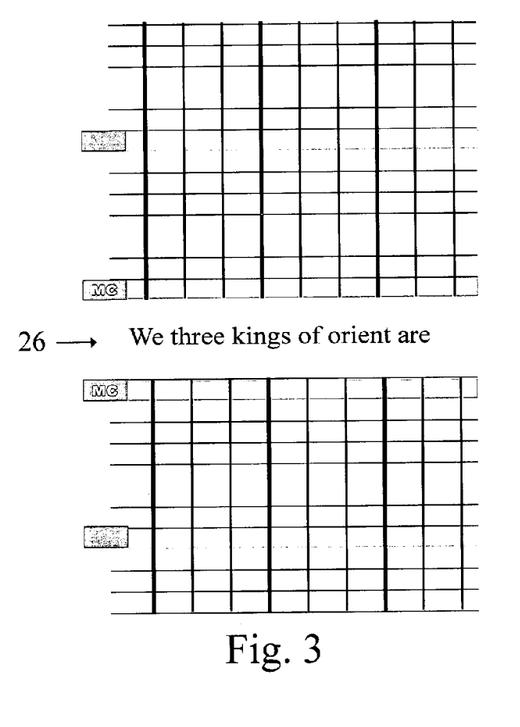

FIG. 3 is an illustration of an alternative embodiment of the invention where a split staff contains lyrics, 26, in the middle.

Figure 4:
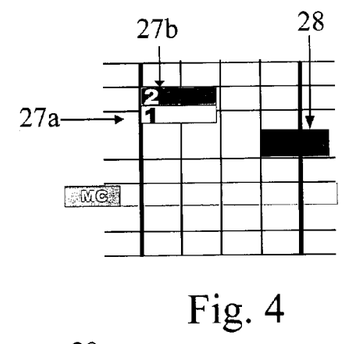
FIG. 4 shows the method used when a C major note must be shown at the same time as an adjacent accidental note and also shows how tied notes at the end of a line are presented.

FIG. 4 shows an accidental note, 27a, to be played simultaneously with an adjacent C major note, 27b. Both notes are shortened slightly to fit within the space. Also shown is a note, 28, tied over to the next line, which is shown by extending the note to the right past the end of the staff.

Figure 5:
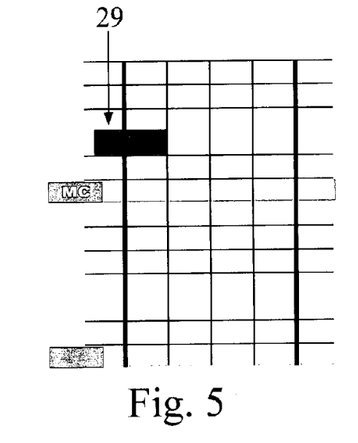
FIG. 5 shows the presentation of tied notes at the beginning of a line.

FIG. 5 shows a note, 29, which is tied over from the previous line. The note, 29, is shown as starting to the left of the first bar in the staff.

Figure 6:
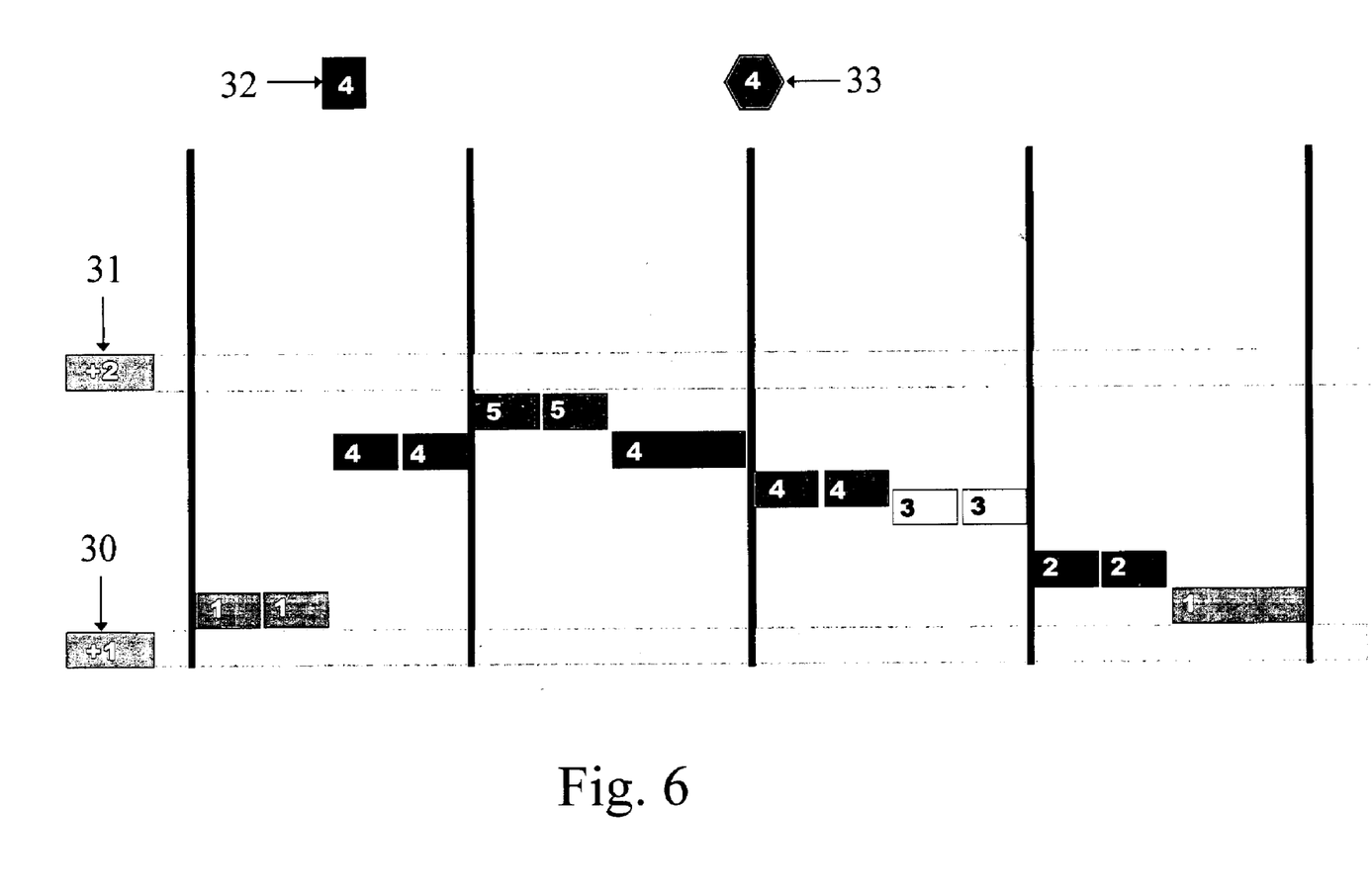
FIG. 6 shows an alternative embodiment of the invention where staff lines and beat demarcation lines are omitted. It also shows fingering aids that indicate spreading and moving of the hand.

FIG. 6 shows an alternative embodiment of the invention with no staff or beat lines. The combination of C shading, colors and bar lines is sufficient for the experienced reader of this notation. The range of this segment does not include Middle C. The C above Middle C is the lowest note on the staff and is marked with a +1, 30, to indicate that this is the first C above Middle C. The C above that is marked with a +2, 31. A square above the staff, 32, indicates that during this melodic passage the hand must be stretched, rather than leaving the fingers on adjoining keys. This warns the reader that the next note is at a further distance from the previous note than the fingering would imply. A hexagon above the staff, 33, indicates the hand is to be moved by lifting it entirely off the instrument. The number in the hexagon indicates the finger to be placed, while the color of the hexagon indicates the note it is to be placed on.

Figure 7:
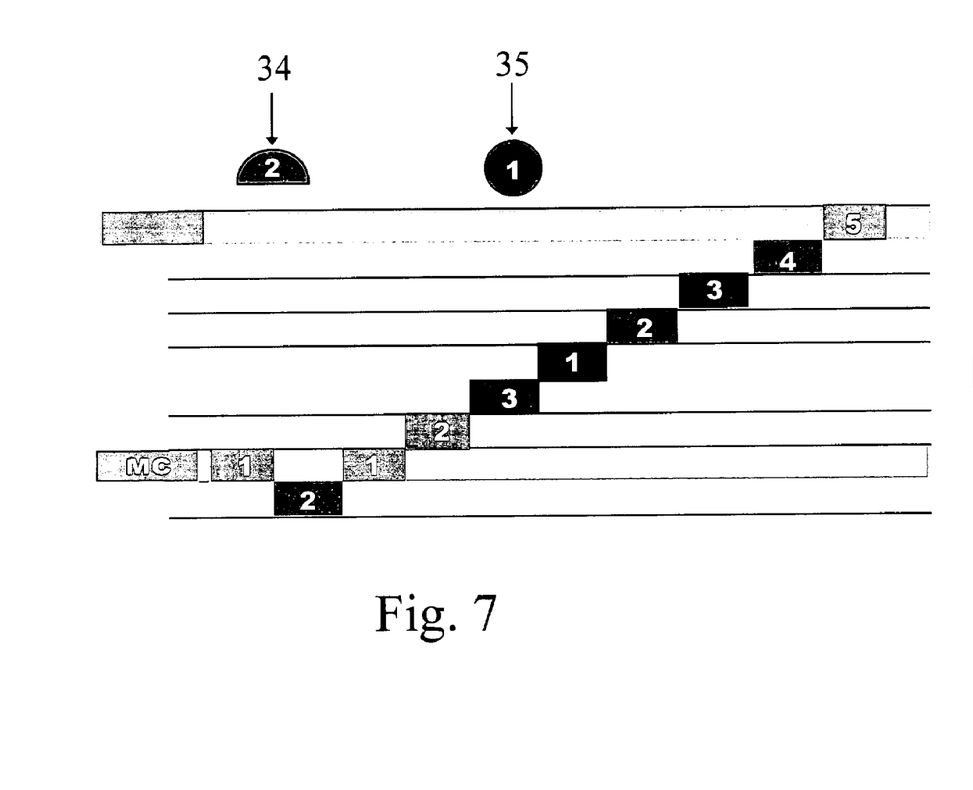
FIG. 7 shows fingering aids related to crossing over or under of the fingers.

FIG. 7 shows two fingering aids used to indicate crossing over or under of the fingers. The half-circle, 34, indicates that a single finger is to cross over the previous finger, immediately returning to its previous position. The full-circle, 35, indicates that a finger is to cross over or under the previous finger without the hand leaving the instrument. In this case, the hand moves along with the finger and assumes a new position on the instrument. If the number is a 1, the thumb is crossing under the previous finger. All other fingers cross over the thumb.

Figure 8:
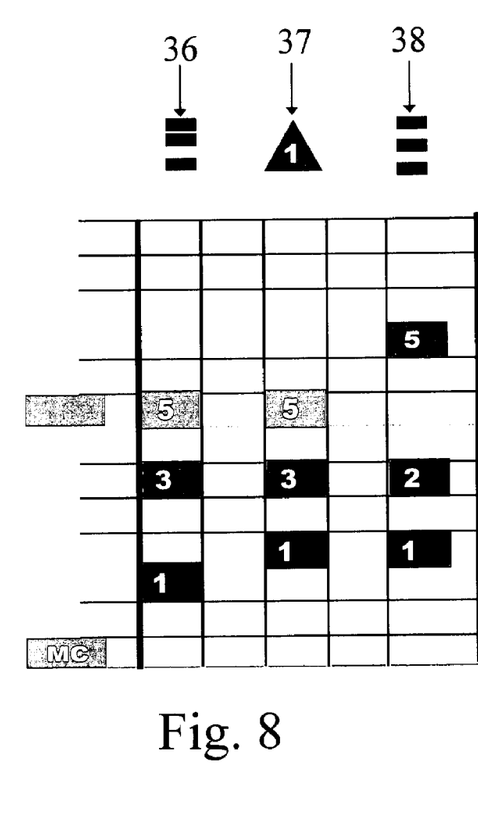
FIG. 8 illustrates fingering aids related to the spreading or closing of the hand during chords.

FIG. 8 shows fingering aids related to chords. Groups of rectangles, 36, 38, are used to quickly indicate the general spacing of a chord. These groups can either be black as in the illustration or in the colors of the notes of the chord. In the first group, 36, the top two rectangles are spaced close together indicating that for this portion of the chord, the fingers are in their normal spacing on the instrument. The additional space between the bottom two rectangles warns the reader that the bottom notes of the chord are farther apart than the normal spacing of the fingers on the instrument The triangle, 37, indicates that the hand has returned to the normal position on the instrument. The second group of black rectangles, 38, indicates that all three notes in this chord are spaced further apart than the normal spacing of the fingers on the instrument.

Figure 9:
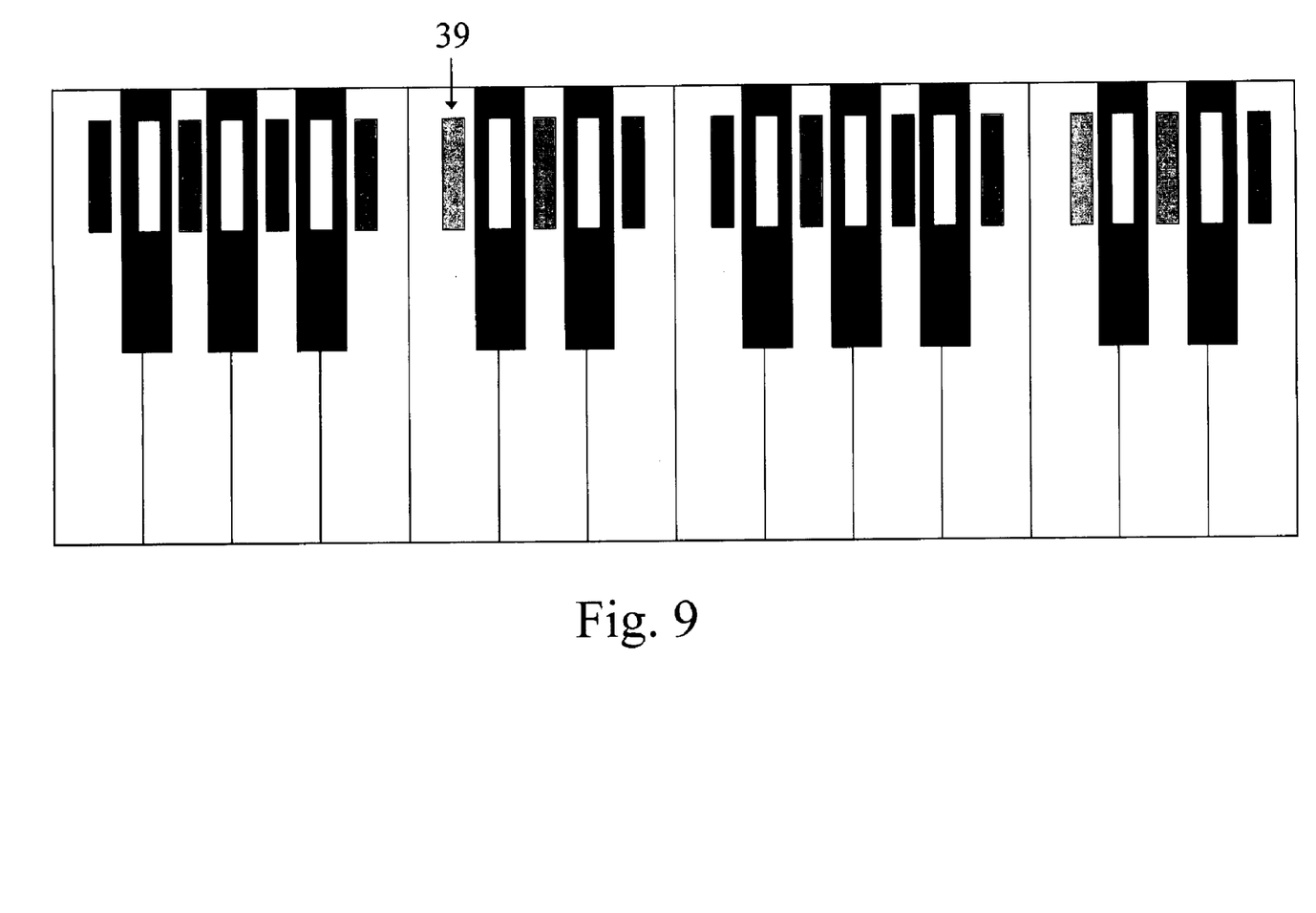
FIG. 9 is an illustration of a portion of a keyboard with colored shapes attached at the rear portion of the keys.

FIG. 9 shows an illustration of a keyboard with colored shapes, 39, attached at the rear of each key to assist the student in quickly identifying the notes by the colors.

Figure 10:
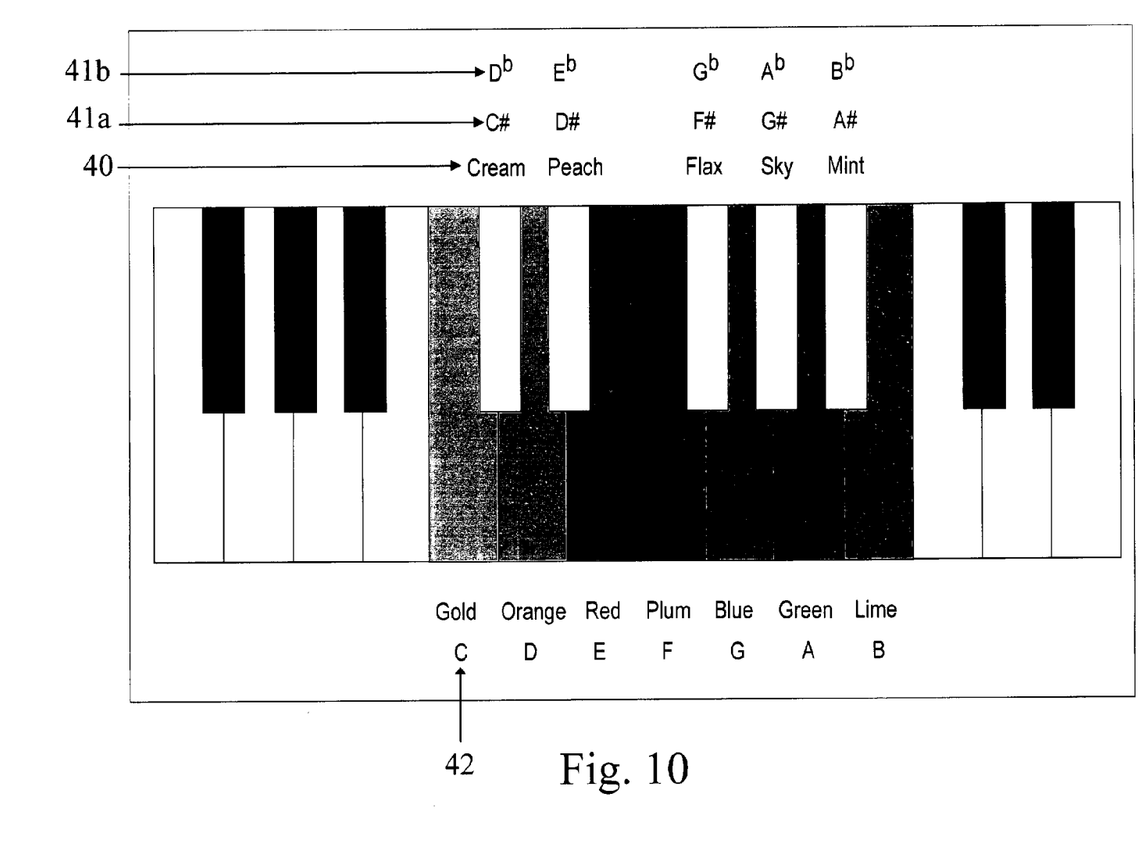
FIG. 10 is a chart for students with the keys of a keyboard shown in colors corresponding to the colors of the preferred embodiment, color names and traditional note names.

FIG. 10 shows a chart with piano keys colored in the colors of the preferred embodiment of the invention. Short color names are included, 40, as well as the conventional names of each C major white key, 42. For accidental black keys, both enharmonic spellings, 41a and 41b, are included.

Figure 11:
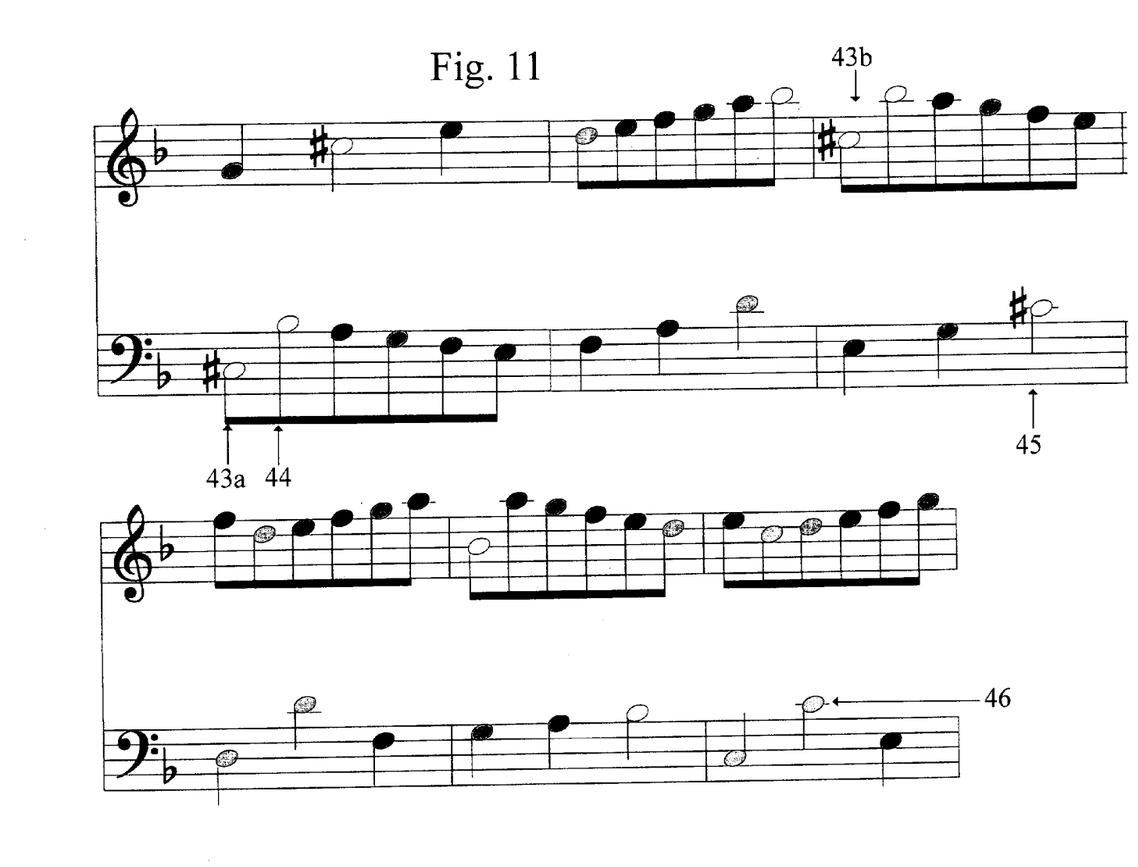
FIG. 11 is a piece of music shown in traditional notation but with each note colored using the colors of the preferred embodiment of this invention.

FIG. 11 shows a piece of music in traditional notation but with each note colored in the preferred embodiment of the invention. The repetition, 43a and 43b, of the same phrase two octaves higher is easily recognizable despite the difference in location due to appearing in the same colors. The Bb, 44, is not shown with an accidental, since it is in the key signature. However, the student will easily recognize it as an accidental since it is colored a pale color. The change from a C#, 45, to a C natural, 46, which is the start of a modulation, will be evident to the student due to the color change between the pale yellow of the C# and the bright gold of the C natural.

DETAILED DESCRIPTION OF THE INVENTION

1. Construction of the Staff

The preferred embodiment of this form of music notation divides the vertical space of an octave into 7 spaces representing the 7 notes of the C major scale. 5 staff lines per octave show the location of the five remaining accidental notes. C major notes are placed between the lines, while the remaining 5 notes straddle the lines, overlapping the C major notes. Multiple forms of the staff are provided. One staff specifically for keyboard instruments combines right and left hand notes for better spatial recognition and covers the four octaves around middle C in one staff. A separate form of the staff separates right and left hand into two staffs, each including middle C. This version is intended for use in cases such as hymns where lyrics are best placed in the center of the staff. For pieces and/or instruments with notes in other ranges the staff is extended up or down to accommodate the range. A contracted form of the staff is useful for beginners, since it can be printed in a larger size. All spaces representing Cs are marked by an appropriately colored shape at the left edge of the staff and the space is lightly shaded the horizontal width of the staff. This shading is important in that it visually separates the octaves all the way across the staff, clarifying the vertical position of the notes. Middle C is marked with MC printed on the colored shape and darker shading. The C's above middle C are optionally marked with +1, +2, as they go up the scale. C's below middle C are optionally marked with −1, −2, etc. in a similar fashion.

2. Representation of Meter and Durations

The representation of meter and durations is based on the proportional representation of the start time and relative duration of each note. For example, a half note will appear twice as wide as a quarter note, and a whole note twice as wide as a half note. The actual width of specific values, such a quarter notes, will vary from piece to piece, in order to make the shortest notes clearly visible. This is decided by the editor of the music, who can set the width of the minimum duration to any width. All other note durations will be derived from the value of the minimum duration. For example, in a piece of music with sixteenth notes as the shortest note, the editor might set the width of a sixteenth note to two tenths of an inch. Eighth notes, which last twice as long, would then be calculated to be twice as wide, thus four tenths of an inch. Quarter notes would be eight tenths of an inch, and so on. Bars are demarcated with bold vertical lines, and beats with less prominent vertical lines. Note that this is a departure from current musical notation which varies the size of measures from line to line in order to make the music end at the end of a staff. In this notation, measures within the same metrical section of a piece will be the same length, and the music may end in the middle of a line.

3. Representation of Individual Notes

Each individual note in the 12 tone scale has its own color, e.g. all Cs are gold, reinforcing visual recognition of what note is seen. For example, in the preferred embodiment the colors used for each note are:

| | |
|---|---|
| C | Bright Gold |
| C#/Db | Pale Yellow |
| D | Bright Orange |
| D#/Eb | Pale Red Orange |
| F | Bright Purple |
| F#/Gb | Pale Blue Violet |
| G | Bright Blue |
| G#/Ab | Pale Blue Green |
| A | Bright Green |
| A#/Bb | Pale Green |
| B | Bright Yellow Green |

The pattern of colors used to traverse the octave follows the basic arrangement of the color wheel. The notes around the two black keys are in the warm color group—gold, orange, and red. The notes around the three black keys are in the cool color group— purple, blue and green. This strengthens the visual distinction between the two sets of black keys.

Two perceptibly distinct groups of colors are used to distinguish between C major notes and the remaining 5 accidental notes. In the preferred embodiment, accidental notes are colored with pale colors and straddle the lines, while C major notes are colored in bright colors and are placed between the lines. When an accidental note (one of the 5 non-C major notes in the 12 tone chromatic scale) is played at the same time as one of its adjacent C major notes, both notes are slightly decreased in height to accommodate the overlap. All notes are shapes, in the preferred embodiment, rectangles, placed in the rhythmic grid described above so that the location and width of each shape is visually proportionate to the start time and duration of the note represented by the shape. For instruments where each hand plays separate notes, notes that are to be played by the left hand have a darker border and modified shape, so that they are clearly distinguishable from right hand notes. Tied notes continue over beat and bar lines. Tied notes that continue from one staff to the next are shown as slightly extending over the right edge of the first staff and beginning slightly before the first bar line on the next staff. Fingerings can be placed above and below the staff as in traditional notation. They can also be placed on the notes themselves. When placed on the notes, fingerings for notes of the C major scale are in white on the bright colors. Fingerings for accidental notes are in black on the pale colors. This strengthens the distinction between C major natural notes and the remaining 5 notes of the 12 tone chromatic scale. Accidentals are not necessary and are not used in this notation.

4. Hand Movement and Fingering Aids

These aids are provided for instruments with keyboards. The normal hand position on the keyboard is with all five fingers on adjacent keys. However, frequently during a piece, the hand must be either moved or stretched to reach different parts of the keyboard. The aids below are optional, but are used to assist keyboard players in determining which particular type of motion is required. The aids are placed above the staff for the right hand and below the staff for the left hand. The following description includes the specific shapes used in the preferred embodiment of this invention. However, any set of distinct shapes can be used to make these indications. A hexagon indicates the hand is to be moved by lifting it entirely off the instrument. The number in the hexagon indicates the finger to be placed, while the color of the hexagon indicates the note it is to be placed on. A half-circle indicates that a single finger is to cross over the previous finger, immediately returning to its previous position. A full-circle indicates that a finger is to cross over or under the previous finger without the hand leaving the instrument. In this case, the hand moves along with the finger and assumes a new position on the instrument. If the number is a 1, the thumb is crossing under the previous finger. All other fingers cross over the thumb. This differs from the hexagon above in that the movement is accomplished without lifting the entire hand from the instrument. A square indicates that during a melodic passage the fingers of the hand are not on adjoining keys, but are spread further apart on the keyboard. The square shows the note and fingering for a note that is at a further distance from the first than the fingering would imply, requiring the hand to be stretched. Groups of two or more black rectangles aligned vertically indicate that during a chord the fingers of the hand are not on adjoining keys, but are spread further apart on the instrument. Rectangles close together within the group indicate normal finger placement, while rectangles further apart indicate the hand must be stretched for this portion of the chord. A triangle indicates that the hand has returned to its normal position with all fingers on adjoining keys. The note and fingering may show the position of any of the fingers, since positioning any one finger will also place the remaining fingers on their proper keys.

5. Dynamics and Other Expressive Markings

All other traditional markings can be used with this notation, including but not limited to tempo markings, dynamics (p, mf, f, crescendo, decrescendo), slurs, and articulation markings (staccato, portando, etc.). These can be placed on, above or below the staff as desired. For the two-staff version of this notation, the area between the staves is also available.

6. Music Notation Assembly Kit

Other helpful items are combined with the notation in a music notation assembly kit to further assist the student in quickly learning to read music. These items include means of coloring all or a portion of the areas on the instrument associated with each of the notes of the 12 tone chromatic scale, charts showing the location of each color of note on the instrument along with the traditional names, written instructions explaining the notation, and CDs containing audio and/or MP3 versions of the music to be played.

7. Path to Conventional Notation

This notation is intended to be used for music of beginning and intermediate levels of difficulty. To ease the transition to conventional notation, the specific colors used in this notation can be used to color the conventional notation. This will aid students in learning to read the various clefs, to recognize accidentals and to remember key signatures.

From the foregoing description of this invention it is apparent that this system of notation has the following advantages over conventional notation:

1. The five line staff and the colors assigned to each note are the same in every octave. There is no requirement to learn the different positions of the same note in different clefs. The shading of spaces representing Cs clarifies the vertical positions of the notes.

2. The rhythmic grid subdivisions are easier to learn than the current note and rest types. The proportionate correspondence between the duration of the notes and their visual representation on the page is immediately perceptible to the student.

3. No key signatures or accidentals are required since the exact key to be played is graphically specified both by the vertical location of the note and by its color. In particular, the very different values for adjoining notes makes the recognition of accidentals much easier. For example, if the note F is bright purple and the note F# is pale blue violet, the student will be able to distinguish these colors easily even though their vertical position on the staff is quite close. This is a significant improvement on previous forms of colored music notation where adjacent note colors are difficult to distinguish. The time required to learn to read the notes can be further reduced through the use of color coding on the instrument, or charts to be placed near the student's practice area.

4. The use of perceptibly distinct color groups also helps the student to recognize chord patterns and key changes, improving their understanding of the function of accidentals. An example of this is when the key changes from C to G, so that the F in the key of C is replaced by the F# in the key of G. The contrast between the bright purple of the F and the pale blue violet of the F# is visually striking and will assist the student in recognizing this modulation.

5. For instruments where separate notes are played with each hand, the single staff layout makes clear the relative position of the hands, while the use of different shapes to represent notes played by each hand is a helpful visual distinction.

6. The use of aids indicating the specific movements of the hands and fingers assists the beginning player in understanding the motions of hands and fingers on the instrument.

7. The small number of different visual elements produces a notation far less complex and confusing than conventional notation.

8. The provision of music notation assembly kits allows students to study an instrument on their own without incurring the cost of a private teacher.

9. The use of perceptibly distinct groups of colors allows the colors to be used on conventional notation, providing the student with a logical transition to reading conventional notation.

The current invention also has significant advantages over the inventions of Peters Notation and FarbMusik. The coloring of the notes instead of the background gives this notation a strong advantage over Peters Notation, since the color of each note sends a more active signal to the player. The exact correspondence between the vertical placement of the notes and their position in the C major scale is more distinct than the overlapping notes of FarbMusik. And a major advantage of this notation over both Peters Notation and FarbMusik is the use of two perceptibly distinct groups of colors, one for the notes of the C major scale and one for the remaining 5 notes of the 12 tone chromatic scale. By emphasizing the difference between C major notes and their adjacent accidental notes, this notation reduces the likelihood of error while reading music and enhances the student's recognition of modulations and chords. In addition, the use of 12 different colors with perceptibly distinct colors on adjacent notes means that these colors can be used to color traditional notation, assisting the student to make the transition to reading conventional notation. This cannot be done as effectively with only the 6 colors of Peters Notation, or the FarbMusik colors where adjacent colors are easily confused. As well as providing a less difficult introduction to music, this invention has an economic advantage for many students. At the current time, large numbers of people of all ages who would love to play an instrument are intimidated by the notation system. For that reason, they feel they can't try to learn an instrument by themselves, even with the help of a book or learning system. This simpler form of notation will allow people to get started with a simple instrument like the recorder or a keyboard, without a commitment of several years of expensive lessons. This invention will also provide a major economic advantage to the music industry, in particular to the music publishing, music teaching and instrument manufacturing segments. With the aid of this invention, students can immediately enjoy playing an instrument, while gradually learning conventional notation. Once they pass the stumbling block of learning conventional notation, they will go on to buy music and to study more about it, greatly enlarging the current market for many music products and services.

This form of notation is suitable for beginning students on all instruments whose music can be notated with the 12 tone chromatic scale, due to the simplicity of its display of rhythms and the elimination of the need for accidentals. In addition, a form of the notation can be used to display all the notes in an ensemble piece on one staff, allowing the listener to clearly view the harmonic and rhythmic content of the piece.

Alternative Embodiments

Although the description above contains many specific details, these should not be construed as limiting the scope of the invention but as merely providing illustrations of the presently preferred embodiments of this invention. Many other variations are possible. For example, multiple staffs of this notation could be combined to display chamber music, vocal music or band music. Versions of this notation for experienced readers may eliminate the staff lines and beat lines, relying on the colors and note widths to communicate the position and duration of notes. The change of one or more notes in the scale indicating a modulation might be specially marked with a symbol above the note or staff.

The shading of the spaces representing C's may be done by coloring these spaces using any colors including but not limited to the colors of the music notation, as exemplified in FIGS. 2, 16, or using other colors including but not limited to beiges, gray blues or olive greens. The value of the colors used in the shading can range from very light to very dark. In the preferred embodiment, middle C is marked by a darker shade of color. Alternative embodiments include shading the lowest C with a dark shade of color and gradually lightening each shade of the color as the pitch of each C increases in height, or the reverse shading with dark shades for the higher C's and lighter shades for the lower C's. In addition, each C could be shaded with a different color. Or the shading of the C's could alternate between dark and light shades or two different colors.

In addition, there are shapes other than rectangles that can be stretched to proportionally represent the duration of the notes. These shapes include, but are not limited to ovals, triangles, parallelograms, trapezoids and diamonds. Any use of shapes stretched to proportionally represent note durations in conjunction with the representation of pitch and color usage of this invention can be considered an alternative embodiment of this invention.

In the preferred embodiment of this invention the vertical placement of the shapes within the notation space is used to represent the pitch of the notes being represented, while the horizontal placement and width is used to proportionally represent the start times and durations of the notes. Alternative embodiments include using the vertical placement to proportionately represent start times and durations and using the horizontal placement to represent the heights of pitches. Any two perceptibly distinct directions on the notation surface could be used to represent pitch and duration. To be perceptibly distinct, two lines each representing one of the directions should not be parallel and one of the angles formed by the intersection of the two lines should be between about 15 and about 90 degrees.

An important feature of this invention is the use of two perceptibly different groups of colors, one group used to color the 7 notes of the C major scale, the other group used to color the remaining 5 notes of the 12 tone chromatic scale. In addition, colors used to color adjacent notes are perceptibly distinct colors. For the purposes of this specification and claims, colors will be discussed in terms of the three attributes hue, value and saturation. The following definitions are from the Merriam-Webster Collegiate Dictionary:

Hue: the attribute of colors that permits them to be classed as red, yellow, green, blue or an intermediate between any contiguous pair of these colors.

Value: relative lightness or darkness of a color

Saturation:

a) chromatic purity: freedom from dilution with white b1) degree of difference from the gray having the same lightness—used of an object color b2) degree of difference from the achromatic light-source color of the same brightness—used of a light-source color For the purpose of this specification and claims, the b1 definition of saturation will be used, so an unsaturated blue would be a blue of any lightness that appears close to gray, while a saturated blue would be a blue of any lightness that does not appear close to gray.

For the purpose of this specification and claims, two colors are perceptibly distinct when a person of average color perception can easily remember and distinguish between the colors even if they are not adjacent to each other on the notation surface. Examples of pairs of colors that are perceptibly distinct to the majority of the population include the following:

A very light blue and a medium value of blue of the same hue.

A medium value of blue and a very dark blue of the same hue.

A medium value blue and a yellow of the same value.

A medium value of a saturated blue and a blue of the same value that is unsaturated, appearing almost gray.

A medium value of purple and a light blue violet

In most cases, a large change in one of the three attributes of a color will produce a perceptibly distinct color. The exception to this is in the area of unsaturated colors. For many people a very grayed blue is difficult to distinguish from a very grayed purple or a very grayed green of the same value. The closer the colors approach to gray, the more difficult it is to distinguish between different hues with the same value.

Also, smaller changes in one attribute are less readily perceptible. For example, a bright red and a bright red-orange of the same lightness value are frequently difficult to distinguish. Likewise two slightly different values of the same red hue will be difficult to distinguish. So to be perceptibly distinct two colors must have a large enough difference in at least one attribute to be easily distinguishable to a person of average color perception even when the colors are not adjacent on the notation surface.

For the purpose of this specification and claims, groups of colors are perceptibly distinct when the colors in one group are within a common range in terms of one or more attributes, and the colors in the second group are within a perceptibly different range in terms of the same attribute or attributes. Examples of perceptibly different groups of colors include:

A group of colors all having light values and a group of colors all having dark values.

A group of colors all having light values and a group of colors all having medium values.

A group of colors all being in the range of hues from green to blue and a second group of colors all being in the range of hues from yellow to red. Note that these groups will only be perceptibly distinct if the colors are fairly saturated.

A group of saturated colors of light values and a group of slightly grayed colors with darker values.

So any method of coloring the notes of the C major scale with a group of colors that is perceptibly different than the group of colors used to color the remaining 5 colors of the 12 tone chromatic scale can be considered an alternative embodiment of this invention.

Although the disclosed description includes some examples of notation specific to keyboard instruments, this notation can be used by many other types of instruments, including but not limited to string instruments, brass instruments, woodwind instruments, melodic percussion instruments and medieval instruments. So, music sheets for any instrument using this notation method can be considered an alternative embodiment of this invention.

The examples of the fingering aids show explicit geometric shapes, including hexagons, squares, etc. However, any set of distinct shapes used to express the same movements of the hands and fingers can be considered an alternate embodiment of this invention.

The items from the musical notation assembly kits disclosed by the figures are specific to keyboard instruments. However, this notation is also appropriate for any instrument whose music can be notated using the 12 tone chromatic scale. Thus, assembly kits containing sheets of music of this notation along with visual aids adapted to other instruments can be considered an alternative embodiment of this invention. Many means can be employed for coloring all or a portion of the area on an instrument used to play a particular note. These means for coloring include, but are not limited to, employing stickers that are colored in accordance with the teachings of this invention, adhesive tapes, markers, post-it notes or other removable media so colored, paints or inks, markers and similar coloring aids.

A notation surface is any surface, flat or otherwise, on which can be displayed notation created with the methods of this invention. Included within the notation surfaces that are adaptable to this invention are paper, plastic sheets, plastic film such as overhead transparencies, canvas, metal sheets, fabrics, and media screens such as computer monitors coupled with the appropriate software.

Thus the scope of the invention should be determined not by the embodiments specified, but by the appended claims and their legal equivalents.

I claim:

1. In a system of music notation, a method of indicating finger and hand movements for playing an instrument comprising:
    (a) a distinct shape indicating the hand is to be moved by lifting it entirely off the instrument,
    (b) a second distinct shape indicating that a single finger is to cross over or under the previous finger and return to its previous position,
    (c) a third distinct shape indicating that a finger is to cross over or under the previous finger without being lifted from the instrument and with the hand taking up a new position,
    (d) a fourth distinct shape indicating that the next note to be played requires the fingers to be stretched further apart than is usual for the instrument,
    (e) a fifth distinct shape indicating that the fingers are returning to their normal position on the instrument and
    (f) a group of shapes aligned in the direction of pitch so that their spacing indicates the areas of a chord that require the hand to be stretched.

2. In the system of music notation of claim 1 employing the method of indicating finger and hand movements for playing the instrument of claim 1, and further including a method of coloring the notes of a 12 tone chromatic scale comprising:
    (a) assigning two perceptibly distinct groups of colors to the notes of the 12 tone chromatic scale, such that one group of 7 colors is assigned to the 7 notes of a C major scale and a perceptibly distinct group of 5 colors is assigned to the remaining 5 notes of the 12 tone chromatic scale and
    (b) coloring each area on a notation surface representing one of the 12 notes of the 12 tone chromatic scale with the appropriate color as assigned in (a).

3. In the method of claim 2, the step of indicating fingering and hand positions and coloring on conventional notation.

4. A method of notating music comprising:
(a) selecting a direction on a notation surface to represent the height of pitches, hereafter referred to as the direction of pitch,
(b) selecting a perceptibly different direction on the notation surface to represent time, hereafter referred to as the direction of time,
(c) selecting a segment of the notation surface in the direction of pitch to represent a space of an octave,
(d) dividing said space of an octave on the notation surface into 7 substantially equal spaces,
(e) placing shapes representing the 7 notes of a C major scale, C, D, E, F, G, A and B on the notation surface in the 7 corresponding spaces of each octave and placing shapes representing the remaining 5 accidental notes of a 12 tone chromatic scale, C#, D#, F#, G# and A# in the notation space so that the shape overlaps the spaces allocated to the two adjacent notes of the C major scale,
(f) placing the shapes representing notes on the notation surface in the direction of time at distances that correspond proportionately to start times of the notes represented by the shapes,
(g) extending the shapes representing notes on the notation surface in the direction of time for distances that correspond proportionately to durations of the notes represented by the shapes,
(h) assigning two perceptibly distinct groups of colors to the notes of a 12 tone chromatic scale, such that a first group of 7 colors is assigned to the 7 notes of the C major scale, and a perceptibly distinct second group of 5 colors is assigned to the remaining 5 notes of the 12 tone chromatic scale wherein said second group is related to said first group by value, hue, or saturation,
(i) coloring each of the shapes representing one of the 12 notes of the chromatic scale with the appropriate color as assigned in (h),
(j) placing numbers within each shape representing a note, said numbers indicating the finger to use to play each note and
(k) coloring the finger indicating numbers of (j) in two perceptibly distinct colors, which colors may include black or white, 1 color for the notes of the C major scale, and a perceptibly distinct color for the remaining 5 notes of the 12 tone chromatic scale.

5. The method of notating music of claim 4, further comprising placing 5 lines per octave on the notation surface in the direction of time, positioned to represent the location of the 5 notes, C#, D#, F#, G# and A#.

6. The method of notating music of claim 5, further comprising separating the notation into two areas on the notation surface and placing words to be sung in the space between the two areas.

7. The method of notating music of claim 4, further comprising placing a colored shape at the edge of each space representing a C, in the color used to represent C in said method of notating music.

8. The method of notating music of claim 7, further comprising shading each space representing a C, from one edge to the other of the music notation in the direction of time.

9. The method of notating music of claim 4, further comprising placing lines on the notation surface in the direction of pitch at distances corresponding to measure intervals as defined in conventional notation.

10. The method of notating music of claim 9, further comprising placing lines on the notation surface in the direction of pitch at distances corresponding to beat intervals as defined in conventional notation.

11. The method of notating music of claim 4, further comprising placing lines on the notation surface in the direction of pitch at distances corresponding to measure and beat intervals as defined in conventional notation, placing 5 lines per octave on the notation surface in the direction of time and positioned to represent the location of the 5 notes, C#, D#, F#, G# and A#, placing a colored shape at the edge of each space representing a C in the color used to represent C in said method of notating music and shading each space representing a C from one edge to the other of the music notation in the direction of time.

12. A sheet of music created in accordance with the method of notating music of claim 4.

13. A music notation assembly kit comprising:
(a) a plurality of sheets of music created in accordance with the method of notating music of claim 4 and
(b) a chart showing a diagram of an instrument with areas of the instrument associated with each note of a 12 tone chromatic scale colored according to said method of notating music.

14. A music notation assembly kit comprising:
(a) a plurality of sheets of music created in accordance with the method of notating music of claim 4 and
(b) means for coloring all or a portion of an area or areas of an instrument associated with each note of a 12 tone chromatic scale according to said method of notating music.

15. A sheet of music created in accordance with the method of indicating fingering and hand positions and of coloring notes of claim 3.

* * * * *